United States Patent
Dicicco

(10) Patent No.: US 10,843,593 B2
(45) Date of Patent: Nov. 24, 2020

(54) ADJUSTING DEVICE FOR LONGITUDINAL ADJUSTMENT OF A VEHICLE SEAT

(71) Applicant: Brose Fahrzeugteile GmbH & Co. KG, Coburg, Coburg (DE)

(72) Inventor: Angelo Dicicco, Royal Oak, MI (US)

(73) Assignee: Brose Fahrzeugteile SE & Co. KG (Coburg), Coburg (DE)

( * ) Notice: Subject to any disclaimer, the term of this patent is extended or adjusted under 35 U.S.C. 154(b) by 0 days.

(21) Appl. No.: 16/384,984

(22) Filed: Apr. 16, 2019

(65) Prior Publication Data

US 2020/0331363 A1 Oct. 22, 2020

(51) Int. Cl.
*B60N 2/07* (2006.01)
*B60N 2/075* (2006.01)
*B60N 2/08* (2006.01)

(52) U.S. Cl.
CPC .......... *B60N 2/0727* (2013.01); *B60N 2/075* (2013.01); *B60N 2/08* (2013.01); *B60N 2/0868* (2013.01)

(58) Field of Classification Search
CPC ........ B60N 2/0727; B60N 2/075; B60N 2/08; B60N 2/0881; B60N 2/0868; B60N 2/0818
USPC .................................................. 248/428, 429
See application file for complete search history.

(56) References Cited

U.S. PATENT DOCUMENTS

| | | | | |
|---|---|---|---|---|
| 5,800,015 A | * | 9/1998 | Tsuchiya | B60N 2/0715 248/430 |
| 6,364,272 B1 | * | 4/2002 | Schuler | B60N 2/072 248/424 |
| 6,616,233 B1 | * | 9/2003 | Debus | B60N 2/123 248/429 |
| 8,172,192 B2 | * | 5/2012 | Hofmann | B60N 2/0705 248/424 |
| 8,191,850 B2 | * | 6/2012 | Wetzig | B60N 2/0727 248/429 |
| 8,251,336 B2 | | 8/2012 | Kimura et al. | |
| 9,469,217 B2 | * | 10/2016 | Hayashi | B60N 2/0881 |

(Continued)

FOREIGN PATENT DOCUMENTS

| | | |
|---|---|---|
| DE | 102008012213 | 9/2009 |
| DE | 102011081107 | 2/2013 |

*Primary Examiner* — Nkeisha Smith
(74) *Attorney, Agent, or Firm* — Renner, Otto, Boisselle & Sklar, LLP

(57) ABSTRACT

A rail assembly for longitudinal adjustment of a vehicle seat comprises a lower rail (2) and an upper rail (1) movable relative to the lower rail, and a movable support member (400) disposed between the lower rail (2) and the upper rail (1), wherein the lower rail (2) comprises a stopper (210) disposed at a predetermined position of the lower rail (2), and the movable support member (400) comprises a base (40) for supporting the upper rail (1) on the lower rail (2) and a coupling member (47) for releasably coupling the movable support member (400) with the upper rail (1).

The coupling member (47) can be displaced relative to the base. Movement of the movable support member (400) relative to the lower rail (2) in the longitudinal direction is stopped by the stopper (210) at the predetermined position, and displacement of the coupling member (47) relative to the base (40) is controlled by the position of the upper rail (1), for controlling a coupling and decoupling of the movable support member (400) to the upper rail (1).

21 Claims, 11 Drawing Sheets

(56) References Cited

U.S. PATENT DOCUMENTS

| | | | |
|---|---|---|---|
| 9,731,629 B2* | 8/2017 | Yamada | B60N 2/0705 |
| 9,902,294 B2* | 2/2018 | Mischer | B60N 2/0705 |
| 10,279,706 B2* | 5/2019 | Harris | B60N 2/0705 |
| 10,343,556 B2* | 7/2019 | Laumeier | B60N 2/0705 |
| 10,486,556 B2* | 11/2019 | Ioppolo | B60N 2/0705 |
| 2007/0158987 A1 | 7/2007 | Hayakawa et al. | |
| 2009/0267396 A1 | 10/2009 | Hofmann et al. | |
| 2011/0101194 A1 | 5/2011 | Wetzig et al. | |
| 2011/0233368 A1* | 9/2011 | Nihonmatsu | B60N 2/0705 248/429 |
| 2017/0001542 A1* | 1/2017 | Loppolo | B60N 2/0705 |

* cited by examiner

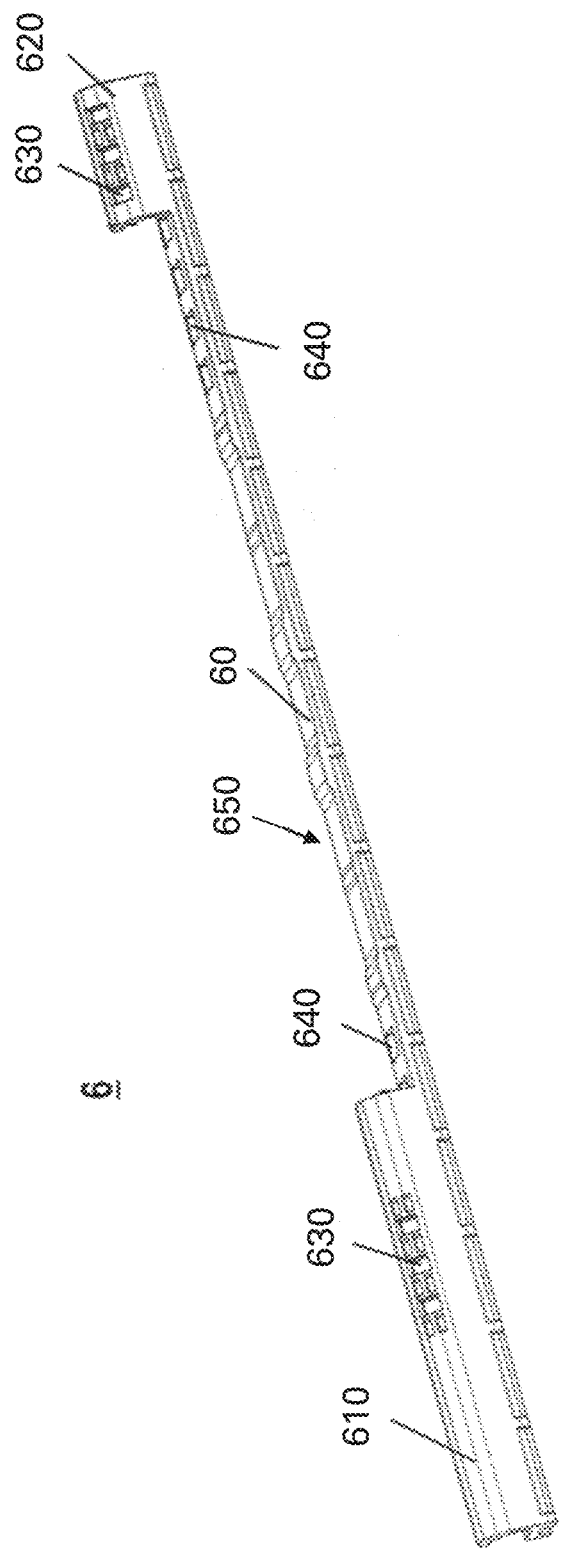

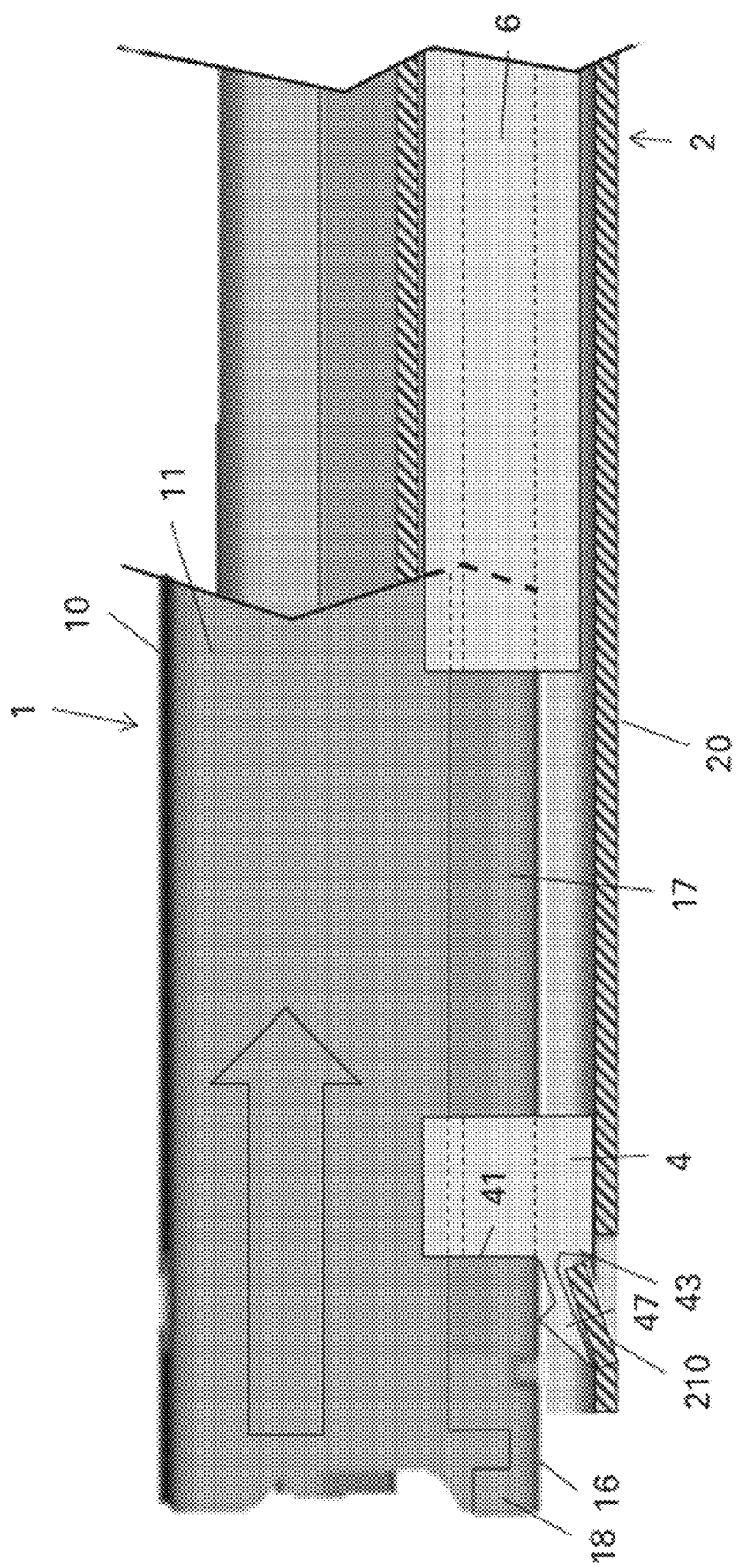

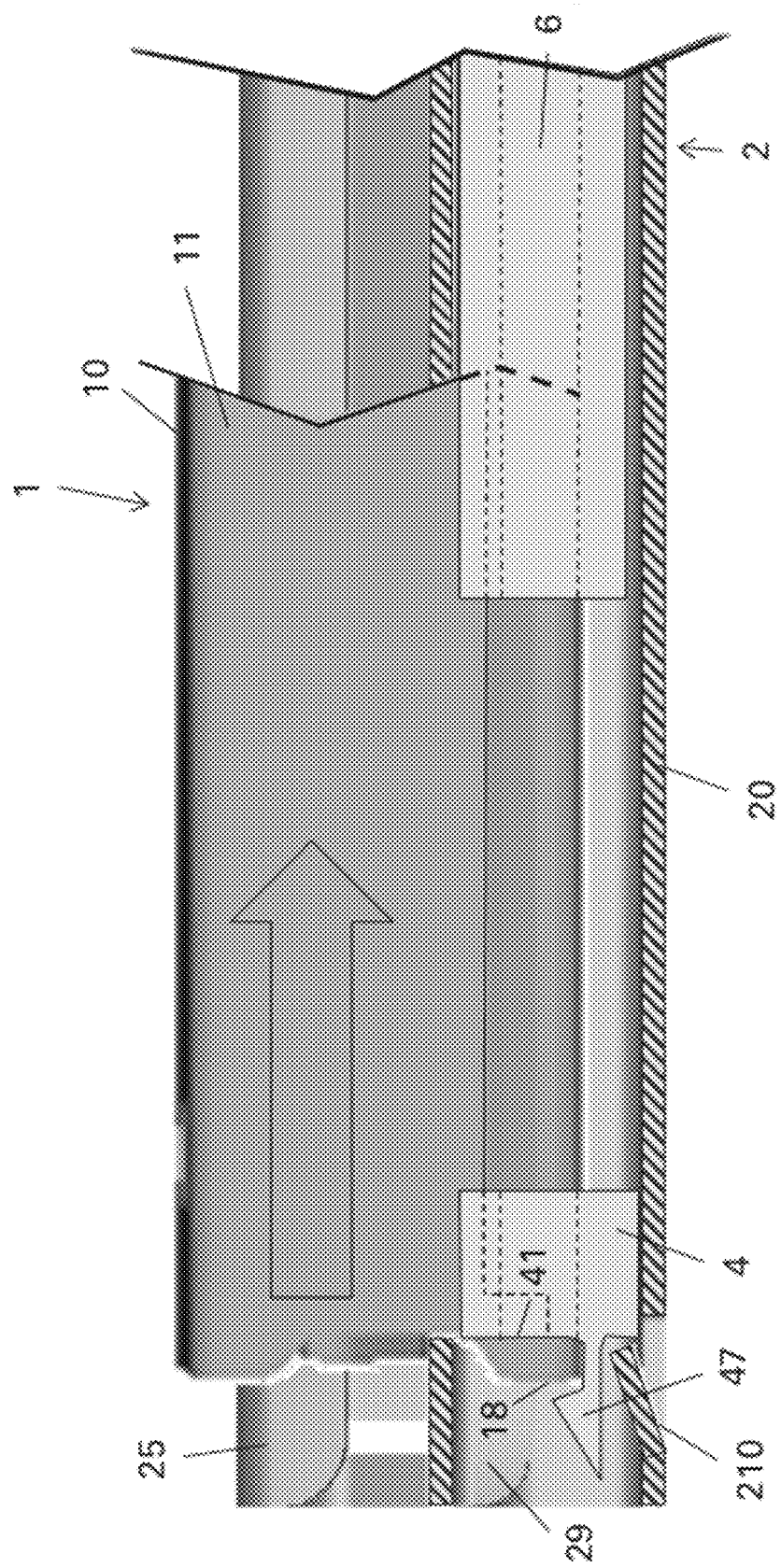

ADJUSTING DEVICE FOR LONGITUDINAL ADJUSTMENT OF A VEHICLE SEAT

FIELD OF INVENTION

The present invention relates to an adjusting device for longitudinal adjustment of a vehicle seat, particularly of a motor vehicle seat.

BACKGROUND

A conventional adjusting device for longitudinal adjustment of a vehicle seat comprises an upper rail, which supports the vehicle seat, and a lower rail, which is usually fixed to the bottom of the passenger compartment of a vehicle. The upper rail can be adjusted relative to the fixed lower rail in longitudinal direction for adjusting the longitudinal position of the vehicle seat as desired by the user. For reliably defining the end positions of the upper rail, end stops are used. In general, the adjusting device shall be as light-weight as possible while ensuring a noise-free adjusting and a high mechanical stability, particularly in the event of a side crash and front crash, where high lateral and vertical loads act on the rails of the adjusting device. A stable support of the vehicle seat is desired in any longitudinal position of the upper rail, particularly also in the extreme positions, i.e. the full forward and full rearward position of the upper rail.

US 2007/0158987 A1 discloses an adjusting device, wherein two oblong retainers are arranged between the lower rail and the upper rail along a longitudinal direction thereof, each comprising a central notch and expanded bearing portions at a front end and rear end of the oblong retainer, for accommodating and supporting steel balls serving as bearing members. The positions of the oblong retainers are fixed by bent, stationary tabs, which are punched out of the lateral bearing area of the upper rail and afterwards bent so as to obstruct a further adjustment of the oblong retainers beyond the positions defined by the tabs. The total travel range of the adjusting device is, however, limited by the fixed positions of the end stop members and cannot be extended.

US 2011/0101194 A1 discloses another example of an adjusting device comprising end stop members that are fixed as separate members to one of the rails and protrude into the gap between the two rails so as to obstruct a further adjustment of the respective rail beyond the extreme position defined by the respective end stop.

In the market, there exists the need for adjusting devices enabling an extended travel range at a total length of the rails as short as possible. For this purpose, US 2017001542 A1 discloses another adjusting device for longitudinal adjustment of a vehicle seat, wherein a first end stop is supported on the upper rail or lower rail at a central position so as to be displaceable in the longitudinal direction, for defining the front end position and/or rear end position of the upper by cooperation with the lower rail or the upper rail and edges of a retainer cage used for accommodating bearing members. Here, the total travel range of the adjusting device is extended, because the central end stop can be displaced in longitudinal direction.

However, the longer the total travel range of the upper rail becomes the larger become problems caused by excessive free play or clearance. Excessive free play in rail assemblies of the above kind may create potential BSR (Buzz, Squeak and Rattle) issues and fatigue issues in which the upper rail is not fully supported. The latter problem exists in particular at the foremost and also rearmost position of the upper rail relative to the lower rail.

The present invention is to address these issues and is to provide an adjusting device for longitudinal adjustment of a vehicle seat with reduced problems caused by excessive free play or clearance, particularly in extreme positions of the upper rail relative to the lower rail. In particular, an adjusting device according to the present invention shall enable a long travel range at a given total length of the rails, and at the same time as light-weight adjusting devices as possible shall be enabled, which nevertheless are stable enough to offer sufficient reliability in daily use and security in extreme situations, particularly in the event of a crash.

SUMMARY OF INVENTION

According to the present invention there is provided an adjusting device for longitudinal adjustment of a vehicle seat, particularly of a motor vehicle seat, comprising: a lower rail and an upper rail, which is movably guided in a longitudinal direction relative to the lower rail, and a movable support member disposed between the lower rail and the upper rail, wherein the lower rail comprises a stopper disposed at a predetermined position of the lower rail, and the movable support member comprises a base for supporting the upper rail on the lower rail and a coupling member for releasably coupling the movable support member with the upper rail, the coupling member being displaceable relative to the base, wherein movement of the movable support member relative to the lower rail is stopped by the stopper at the predetermined position, and displacement of the coupling member relative to the base is controlled by the position of the upper rail, for controlling coupling and decoupling of the movable support member to the upper rail.

According to the present invention a spacer disposed in a gap between the upper and lower rail and serves as a support member for additionally supporting the upper rail on the lower rail. This spacer is not stationary, but can be moved in the longitudinal direction of the rail assembly. According to the present invention this spacer is used for additionally supporting the upper rail on the lower rail on the front and/or rear end of the rail assembly, for providing an enhanced stability throughout the travel range of the upper rail, and in particular when the upper rail is positioned at the foremost and/or rearmost position of this travel range. For this purpose, the spacer or movable support member comprises a locking feature so that it can be releasably locked to the upper rail. Thus, the upper rail can carry along the movable support member up to the front or rear end of the lower rail, where a stopping feature is provided for stopping a further travel of the movable support member at the front or rear end of the lower rail, for delimiting the travel range of the upper rail relative to the lower rail. This stopping feature simply protrudes into the inner volume of the rail assembly and abuts against the movable support member at a predetermined position of the lower rail. When the movable support member is stopped at this predetermined position, which may be at the front or rear end of the lower rail, the locking of the movable support member to the upper rail is released. For this purpose, the movable support member further comprises a movable or displaceable coupling member, wherein the condition of this coupling member relative to a base of the movable support member is controlled by the position of the upper rail relative to the lower rail. Particularly, if the upper rail enters the region of the predetermined position with the stopping feature, the upper rail displaces, deforms or flexes the locking feature, to thereby release the temporary locking of the coupling member with the upper rail.

For temporarily locking the coupling member with the upper rail, any kind of locking members suited for enabling a releasable, temporary coupling between these two members can be used. Particularly, positive locking structures may be used for this purpose, wherein the engagement of these positive locking structures may be controlled and released by the position of the upper rail relative to the lower rail, when the upper rail is in the region near the predetermined position.

According to a further embodiment, when the upper rail is moved relative to the lower rail in a first direction beyond the predetermined position, the movable support member is retained by the stopper, in particular by positive engagement with the stopper, and the coupling member is displaced to a release position releasing a coupling of the movable support member to the upper rail, so as to enable a further movement of the upper rail in the first direction.

According to a further embodiment, when the upper rail is moved relative to the lower rail in a second direction opposite to the first direction beyond the predetermined position, the coupling member returns to a coupling position coupling the movable support member to the upper rail so that the movable support member is carried by the upper rail upon further movement of the upper rail in the second direction.

According to a further embodiment the coupling member is resiliently biased against base into the coupling position, thereby enabling an automatic return of the coupling member to an unbiased home position, which is the afore-mentioned coupling position, in which the coupling member may couple the movable support member again with the upper rail.

According to a further embodiment the coupling member is connected with the base via a flexible leg. Preferably, the configuration of this flexible leg is suited to enable the automatic return of the coupling member to the afore-mentioned coupling position.

According to a further embodiment the coupling member is integrally formed with the base, which eases manufacturing of the coupling member by integral forming from a plastic material, e.g. a resin, using injection molding technology.

According to a further embodiment the coupling member is pivotable about a pivot point of the base.

According to a further embodiment the coupling member automatically returns to the coupling position when the upper rail is moved relative to the lower rail in the second direction toward the predetermined position.

According to a further embodiment the coupling member positively engages with a front end or rear end of the upper rail in the coupling position, for releasably coupling the coupling member and hence the movable support member with the upper rail.

According to a further embodiment a tab is provided at a front end or rear end of the upper rail configured to positively engage with the coupling member, for releasably coupling the movable support member with the lower rail.

According to a further embodiment the tab protrudes from a lateral leg of the upper rail toward an interior of the rail assembly.

According to a further embodiment in the coupling position the tab further abuts against an end face of the movable support member.

According to a further embodiment the coupling member is configured to be pushed by the upper rail toward the lower rail when positioned at the predetermined position, so as to release coupling of the movable support member to the upper rail and to enable a further movement of the upper rail in the first direction.

According to a further embodiment the coupling member is connected with the base via a connecting leg and is wedge-shaped, wherein the coupling member comprises a slanted front bevel facing toward a first end of the coupling member and a slanted rear bevel facing toward the base of the movable support member. This configuration of the coupling member eases the afore-mentioned control of the coupling member by the position of the upper rail relative to the lower rail.

According to a further embodiment an angle of inclination of the front bevel relative to a bottom surface of the connecting leg is smaller than an angle of inclination of the rear bevel relative to the bottom surface of the connecting leg.

According to a further embodiment a length of the connecting leg in the longitudinal direction corresponds to a length of tab of the upper rail in the longitudinal direction.

According to a further embodiment the stopper is formed at a bottom of the lower rail and protrudes into an inner volume of the rail assembly.

According to a further embodiment the stopper is formed as a planar retention tab protruding under an acute angle relative to the bottom of the lower rail into the inner volume of the rail assembly.

According to a further embodiment the coupling member is connected with the base via a connecting leg, wherein in the released position the connecting leg is displaced relative to the base so as to abut against the retention tab.

According to a further embodiment the adjusting device further comprises an oblong retainer for accommodating bearing members is disposed between the lower rail and the upper rail, wherein the oblong retainer is supported so as to be displaceable in the longitudinal direction.

According to a further embodiment the oblong retainer does not extend beyond a front edge or rear edge of the upper rail or lower rail in any of the end positions of the upper rail.

According to a further aspect of the present invention there is provided a rail assembly for longitudinal adjustment of a vehicle seat, comprising: a lower rail and an upper rail, which is movably guided in a longitudinal direction relative to the lower rail, and a movable support member received in a gap between the lower rail and the upper rail and slidable in the gap in the longitudinal direction, wherein the lower rail comprises a protrusion disposed at a predetermined position of the lower rail, which narrows the gap between the lower rail and the upper rail at the predetermined position, for limiting a travel range of the movable support member in the longitudinal direction, wherein the movable support member comprises: a supporting surface for additionally supporting the upper rail on the lower rail, a stopping surface for delimiting the travel range of the movable support member in the longitudinal direction by abutment against the protrusion at the predetermined position, and a coupling member for releasably coupling the movable support member with the upper rail, wherein the coupling member protrudes from the stopping surface so as to extend beyond the protrusion when the supporting surface abuts against the protrusion, the coupling member further comprises a locking member for positively locking the coupling member with the upper rail, and the coupling member can be elastically deformed or flexed toward the protrusion for releasing a positive locking between the coupling member and the upper rail when the supporting surface abuts against the protrusion.

According to a further aspect of the present invention there is provided a rail assembly for longitudinal adjustment of a vehicle seat, comprising: a lower rail and an upper rail, which is movably guided in a longitudinal direction relative to the lower rail; and a movable support member, for additionally supporting the upper rail on the lower rail; wherein a gap is formed between the lower rail and the upper rail, and the movable support member is received in the gap and slidable in the gap in the longitudinal direction of the rail assembly; wherein the lower rail comprises a protrusion disposed at a predetermined position of the lower rail, and the protrusion narrows the gap between the lower rail and the upper rail at the predetermined position, for limiting a travel range of the movable support member in the longitudinal direction at the predetermined position; wherein the movable support member comprises: a coupling member for releasably coupling the movable support member with the upper rail, wherein a coupling and decoupling of the movable support member to the upper rail is controlled by positioning the upper rail at the predetermined position.

OVERVIEW ON DRAWINGS

Hereinafter, the invention will be described with reference to preferred exemplary embodiments and with reference to the drawings, from which additional advantages, features and tasks of the present invention will become apparent and wherein:

FIG. 1b shows the general configuration of an upper rail of the rail assembly of FIG. 1a;

FIG. 1c shows a retainer for use in the rail assembly of FIG. 1a in a perspective view;

FIG. 2a shows a front view of a movable support member according to a first embodiment of the present invention, for use in the rail assembly of FIG. 1a;

FIG. 2b is a side view of a movable support member according to the first embodiment of the present invention, for use in the rail assembly of FIG. 1a;

FIGS. 3a-3e show a rail assembly according to the present invention in different positions of the upper rail relative to the lower rail in a partial cross-sectional view, for controlling coupling and decoupling of the movable support member to the lower rail by displacement of the coupling member relative to the base of the movable support member of FIG. 2b;

FIG. 4a shows a front view of a movable support member according to a second embodiment of the present invention, for use in the rail assembly of FIG. 1a;

DETAILED DESCRIPTION OF PREFERRED EMBODIMENTS

Before describing details of the coupling and decoupling of the movable support member with the upper rail according to the present invention, in the following the general geometry of an exemplary adjusting device for longitudinal adjustment of a vehicle seat will be described with reference to FIG. 1a. It should be noted, however, that the invention shall not be construed to be delimited only to the particular geometry of the adjusting device shown in FIG. 1a.

Figure 1A:
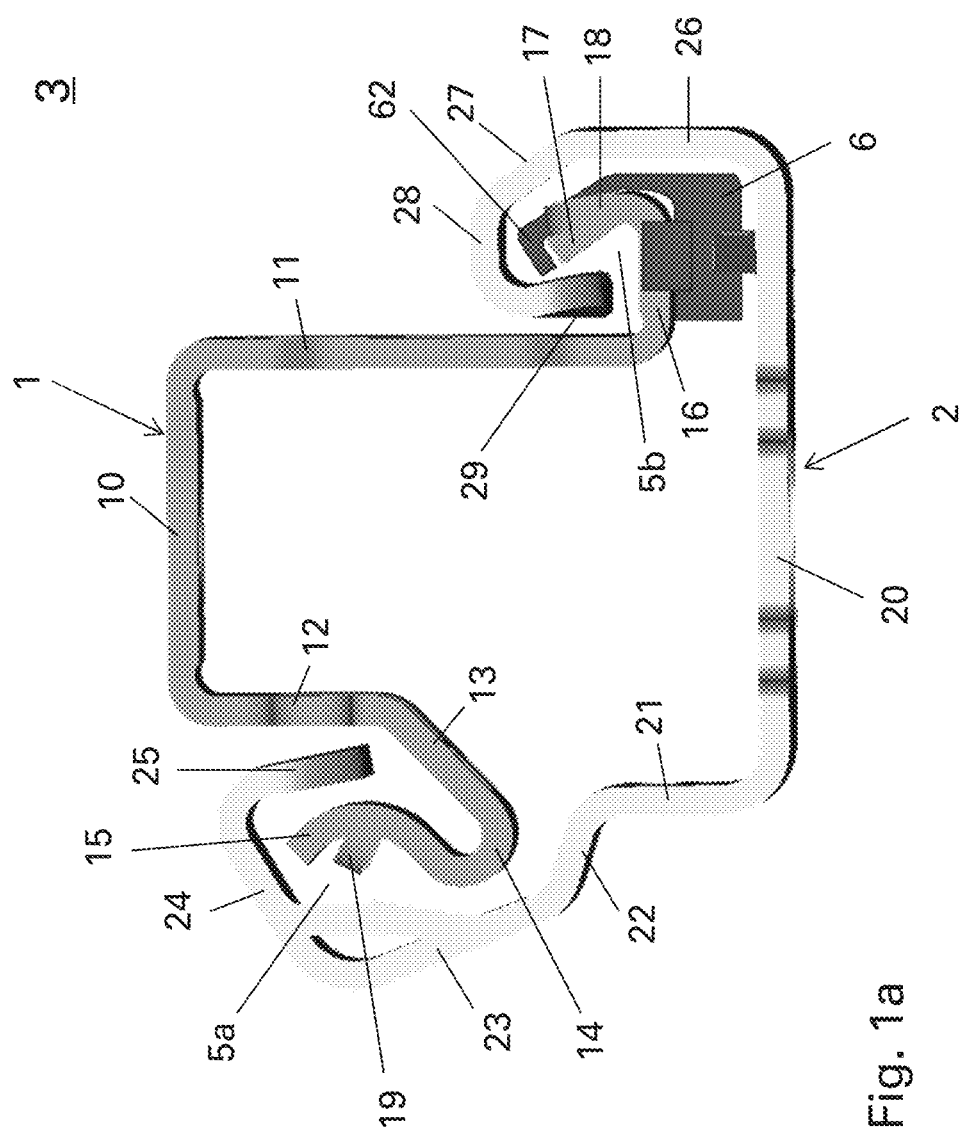
FIG. 1a shows the general configuration of a rail assembly for longitudinal adjustment of a vehicle seat according to the present invention.

As shown in FIG. 1a, the adjusting device 3 for longitudinal adjustment of a vehicle seat has a substantially rectangular profile and consists of an upper rail 1 mounted on lower rail 2 so as to be displaceable in longitudinal direction along lower rail 2. As shown in FIG. 1a, the upper rail 1 is substantially inverse U-shaped and comprises a horizontal base leg 10 (bottom) and an L-leg 11 projecting substantially perpendicularly from the base leg 10. Generally, lateral extensions of the two U-shaped rails 1, 2, such as the portions of the rails 1, 2 indicated by reference numerals 16, 17 and 36, 27, 28, 29 and by reference numerals 13, 14 and 23, 24 and 25, respectively, are mated to each other.

More specifically, the L-leg 11 is adjoined with a horizontal third connecting leg 16, which is followed by a bearing leg 17, which represents a second end portion of the upper rail 1 and extends under an acute angle upward and toward the interior of the upper rail 1. On the opposite side, a first connecting leg 12 extends substantially perpendicularly to the base leg 10 and in parallel with the opposite L-leg 11. The first connecting leg 12 is followed by a second connecting leg 13, which extends under an acute angle downward and toward the outer side of the upper rail 1. The second connecting leg 13 is followed by a bending portion 14 and a first end portion 15, which is semi-circularly curved in correspondence with the radius of curvature of a bearing member (not shown), such as a retainer to be supported between the first end portion 15 and a corner region formed by the second and third connecting legs 23, 24 of the upper rail 1 which are disposed opposite to the first end portion 15, with a plurality of rollers received in recesses of the bearing member.

As shown in FIG. 1a, the lower rail 2 is substantially U-shaped and comprises a horizontal base leg 20 (bottom) and an L-leg 21 projecting substantially perpendicularly and upward from the base leg 20. The L-leg 21 is adjoined with a slanted first connecting leg 22, which extends outwards from lower rail 2, preferably inclined upward, which is followed by a second connecting leg 23, which extends under an acute angle outwards and upwards relative to base leg 20, and a third connecting leg 24, which extends under an acute angle inwards and upwards relative to base leg 20, and is finally followed by the first end portion 25, which extends downward, toward base leg 20 and into the gap between the first connecting leg 12 of upper rail 1 and the opposite first end portion 15 of upper rail 1. A retainer (not shown), which may support a plurality of balls, is supported in linear guide 5a formed by the semi-circular curved first end portion 15 of upper rail 1 and the opposite corner region between second connecting leg 23 and third connecting leg 24 of lower rail 2, and serves as a bearing member between the upper rail 1 and lower rail 2 in bearing area of the linear guide 5a.

On the opposite side, a fourth connecting leg 26 extends substantially perpendicularly to the base leg 20 and in parallel with the opposite L-leg 21. The fourth connecting leg 26 is followed by a fifth connecting leg 27, which extends under an acute angle upward and toward the inner side of the lower rail 2. The fifth connecting leg 27 is followed by a sixth connecting leg 28, which extends in parallel with horizontal base leg 20 and inward, and by the second end portion 29, which extends downward toward base leg 20 and into the gap between the bearing leg 17 and L-leg 11 of upper rail 1.

Thus, the first and second end portions 25, 29 (lateral extensions) of the lower rail 2 embrace the corresponding first and second end portions 15, 17 of the upper rail 1. The bearing areas, which are formed by opposite portions of the upper rail 1 and lower rail 2, respectively, namely by the first end portion 15 of the upper rail 1 and the second and third connecting leg 23, 24 of the lower rail 2 and by the second end portion of the upper rail 1 and the fifth connecting leg 27 of the lower rail 2, are thus diagonally offset to each other and biased against each other. Thus, linear guides 5a, 5b for accommodating and supporting rolling elements are formed at the end portions of upper and lower rail 1, 2. As shown in FIG. 1a, the linear guide 5b at the right-hand side in FIG. 1a is of rectangular shape and thus configured to accommodate a retainer 6 of corresponding rectangular shape, whereas the linear guide 5a at the left-hand side in FIG. 1a is of cylindrical shape and thus configured to accommodate and support a bearing member of corresponding cylindrical shape.

More specifically, the linear guide 5b between the two rails 1, 2 on the right-hand side of FIG. 1a is formed by respectively opposite, parallel legs of the two rails 1, 2, namely between the base leg 20 of lower rail 2 and opposite third connecting leg 16 of upper rail 1 and between the fourth and fifth connecting legs 26, 27 of lower rail 2 and opposite bearing leg 17 of upper rail 1.

As shown in FIG. 1a, at the front end of the upper rail 1 tabs 18, 19 may be provided, e.g. by punching out of the second end portion 17, and of the first end portion 15 of the upper rail 1 and further bending the resulting tabs 18, 19 as shown in the drawings. These tabs 18, 19 may serve as end stoppers for delimiting the travel range of the upper rail relative to the lower rail and defining a foremost position of the upper rail relative to the lower rail. At the same time, these tabs 18, 19, in particular the tab 18 provided in the bearing area of the linear guide 5b, may serve for assisting the coupling of a movable support member with the upper rail, as outlined below in more detail.

Figure 1B:
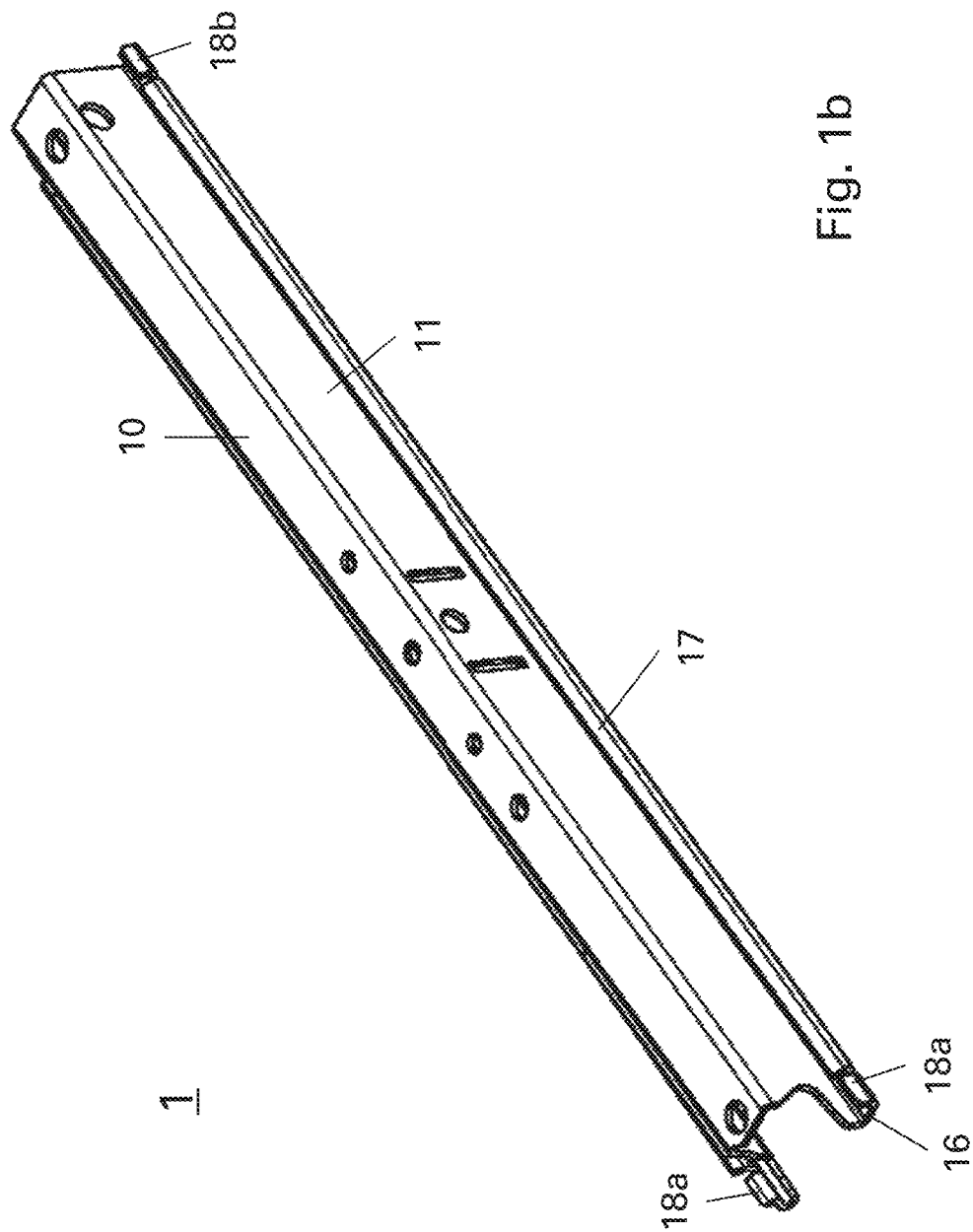

As will become apparent to the person skilled in the art, corresponding tabs may be provided at the rear end of the upper rail 1, or as an alternative at both the front and rear end of the upper rail 1, as shown in FIG. 1b, which shows the general configuration of an example of an upper rail of the rail assembly of FIG. 1a. As shown, tabs 18a are provided at the front end of upper rail 1, and corresponding tabs 18b are provided at the rear end of upper rail 1.

As shown in FIG. 1a, a retainer 6 is disposed between the upper and lower rail 1, 2, for supporting a plurality of bearing members, such as rollers or balls, for reducing friction between the upper and lower rail 1, 2 in the bearing area 5b.

FIG. 1c is a perspective side view of the retainer 6 for use in the rail assembly of FIG. 1a. The retainer 6 is an oblong structure, preferably made of plastic material or resin, and comprises an oblong, rectangular base 60, which may comprise pockets or recesses 630, 640 for receiving grease or lubricant and bearing members for reducing friction, such as rollers or balls. The oblong retainer 6 has a substantially L-shaped cross-section, and further comprises an upright side-wall extending substantially perpendicularly to the base 60, which merges into a slanted side-wall 610, 620 at a front and rear end of retainer 6. The upper edge of the side-walls 610, 620 may be inclined inward, in correspondence with the particular geometry of the rail assembly 3 (see FIG. 1a).

The angle included between the base 60 of retainer 6 and the slanted side-walls 610, 620 corresponds to the angle included between the third connecting leg 16 (see FIG. 1a) of lower rail 2 and the third connecting leg 17 of lower rail 2. Further, the upper end of retainer 6 may embrace the free end of third connecting leg 17 and thus may extend into the gap between the second end portion 29 of upper rail and the third connecting leg 17 to prevent a direct contact in this bearing area.

In the rail assembly as shown in FIG. 1a, the base 60 is supported directly on an opposite bearing leg of the lower rail 2. Furthermore, also the outer surfaces of the side-walls 610, 620 of retainer 6 are disposed opposite to bearing legs of the upper or lower rail 1, 2 and may be formed as planar surfaces, which may comprise pockets or recesses for receiving grease or lubricant and additional bearing members, such as rollers or balls, for reducing friction.

Figure 2A:
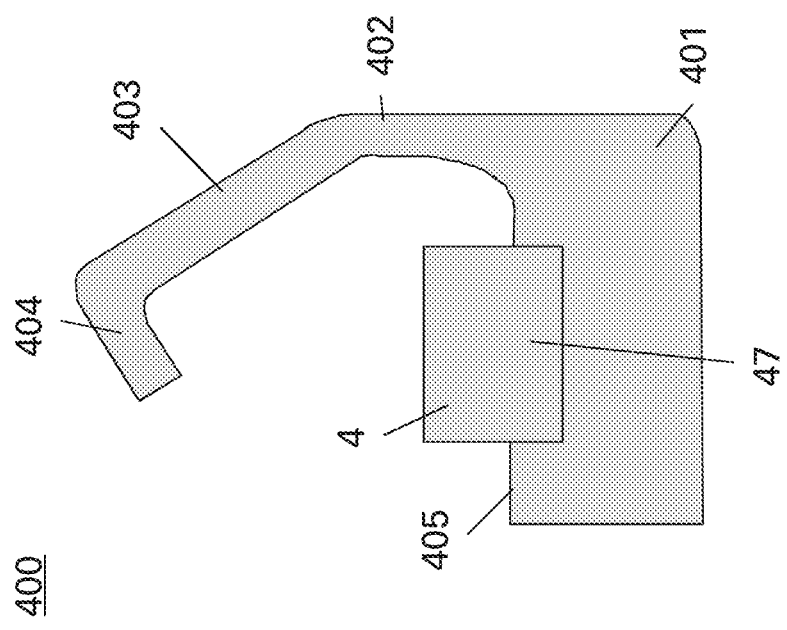

FIG. 2a is a front view of a movable support member 400 provided in front of the front end of retainer 6 and/or behind the rear end of retainer 6. Thus, the movable support member 400 is disposed near the front end of the rail assembly and/or near the near end of the rail assembly.

The movable support member 400 has basically the same profile as the retainer shown in FIG. 1c. The movable support member 400 is generally L-shaped in cross-section and may be made of plastic material or resin, in particular by injection molding. The movable support member 400 comprises a base 401, which has a rectangular cross-section, and an upright side-wall 402 extending substantially perpendicularly to the base 401, which merges into a slanted side-wall 403 extending vertically upward under an acute angle of about 60°. The upper edge 404 of the slanted side-wall 403 may be inclined inward, in correspondence with the particular geometry of the rail assembly 3 (see FIG. 1a). The angle included between the base 401 and the slanted side-wall 403 corresponds to the angle included between the third connecting leg 16 (see FIG. 1a) of lower rail 2 and the third connecting leg 17 of lower rail 2. Further, the front end 404 may embrace the free end of third connecting leg 17 and thus may extend into the gap between the second end portion 29 of upper rail and the third connecting leg 17 to prevent a direct contact in this bearing area.

The upper side of the base 401 serves as a supporting surface 405 on which the underside of the third connecting leg 16 of the upper rail 1 (see FIG. 1a) is directly supported. Thus, the movable support member 400 acts as an additional support member for additionally supporting the upper rail 1 on the lower rail 2 in the region of linear guide 5b. More specifically, the movable support member 400 additionally supports the upper rail on the lower rail regardless of the position of the upper rail 1 relative to the lower rail 2 and in particular in a foremost or rearmost position of the upper rail 1 relative to the lower rail 2.

At the front end of the movable support member 400 there is provided a tab 4. Preferably, the tab 4 is formed integrally with the main body of the movable support member 400.

The height of the tab 4 in vertical direction is larger than the height of the base 401 of the movable support member 400, so that in use the tab 4 of the movable support member 400 will extend from the upper surface of base leg 20 of the lower rail 2 up to the level of the tab 18 provided at the front end of the slanted bearing leg 17 of the lower rail 2 (see FIG. 1a), to enable a control of the position of the tab 4 by the position of the upper rail 1, as outlined below in more detail. Whereas the supporting surface 405 of base 401 is basically flush with the underside of the third connecting leg 16 of the upper rail 1, the tab 4 projects vertically beyond the third connecting leg 16 of the upper rail 1. In other words, the height of the base 401 of the movable support member 400 in vertical direction corresponds to the width of the gap provided between the base leg 20 of lower rail 2 (see FIG. 1a) and the opposite third connecting leg 16 of upper rail 1. Thus, if the front end of the upper rail 1 is moved in a first direction toward the movable support member 400, the movable support member 400 will finally be carried along by the upper rail 1, due to the abutment of an end face of the tab 4 with the front end of the upper rail 1, more specifically with the tab 18 of upper rail 1, as outlined below in more detail.

As will become apparent to the person skilled in the art, the movable support member 400 may also be disposed behind the rear end of the retainer, near the rear end of the rail assembly. According to a further embodiment, the movable support member 400 may also be disposed both near the front end of the rail assembly and near the rear end of the rail assembly.

Figure 2B:
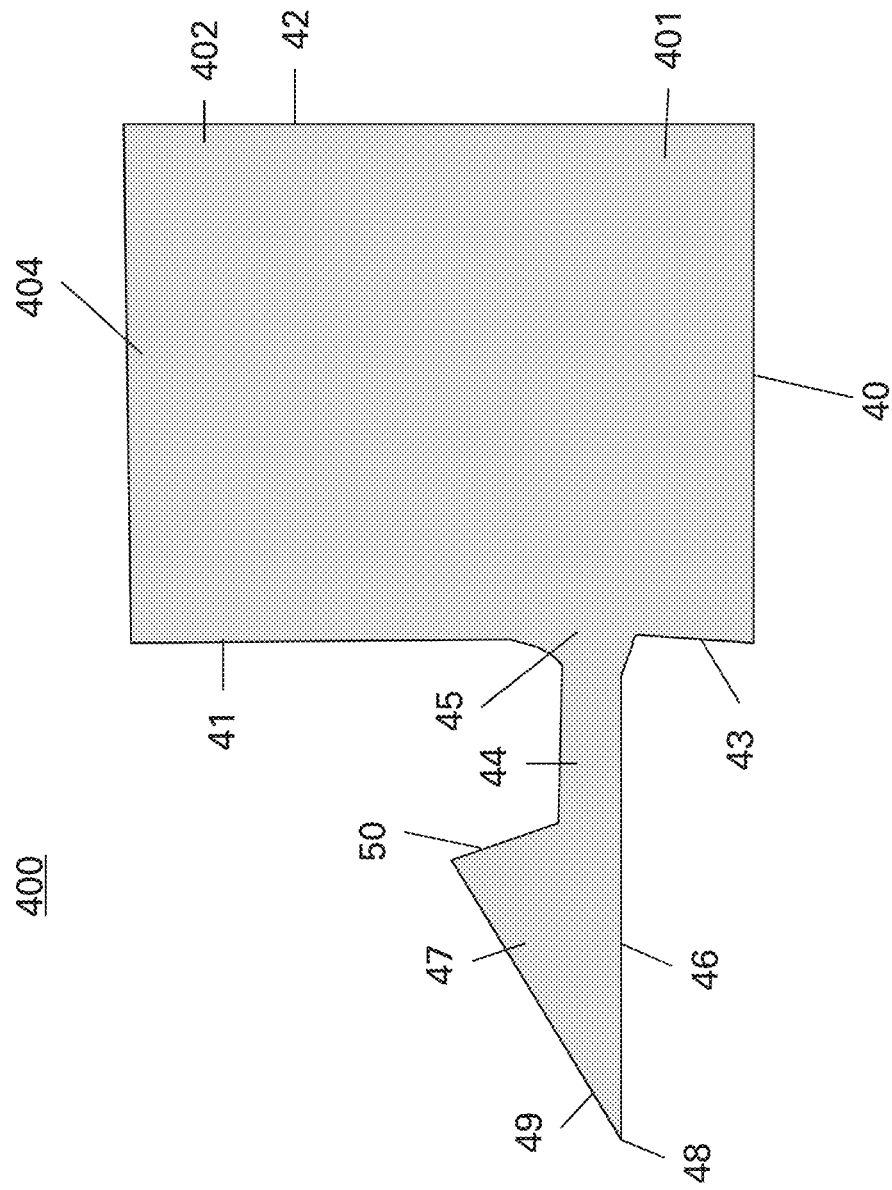

The general configuration of the tab 4 is shown in more detail in the side-view of the movable support member of FIG. 2b. In the side view of FIG. 2b, the movable support member 400 is formed as a main body 40 of rectangular or quadratic shape. A coupling member 47 is connected or coupled with the main body 40 and is generally wedge-shaped. The coupling member 47 may be integrally formed with the main body 40 of the movable support member 400, as shown in FIG. 2b, e.g. by injection molding of a plastic material, or may be a separate member connected with the base 401 of the movable support member 400, as described below in more detail with reference to FIG. 4b.

The movable support member 400 has a front face 41, which is directed toward the front end of the rail assembly if the movable support member 400 is provided near the front end of the rail assembly, and a rear face 42, opposite to the front face 41 and preferably extending in parallel with the front face 41. In the lower half of the movable support member 400 the coupling member 47 is connected with the main body 40 via a connecting leg 44, the base 45 of which may be slightly thicker to ensure a sufficient mechanical strength in the region, where the connecting leg 44 is connected or coupled with the main body 40. The front face 43 below the connecting leg 44 may be inclined by a relatively small angle of inclination toward the rear face 42 relative to a vertical on the bottom side of main body 40, which might assist the positive engagement of the surface 43 in the space provided underneath a retention tab 210 provided at the base leg 20 of lower rail 2 (see FIG. 3c), as outlined below in more detail.

The connecting leg 44 has a rectangular profile or preferably a circular profile and projects perpendicularly to the front face 41 toward the front end of the rail assembly, if the movable support member 400 is provided near the front end of the rail assembly. At the front end of the connecting leg 44 a wedge-shaped coupling member 47 is provided, which is preferably integrally formed with the connecting leg 44, as shown in FIG. 2b. The bottom surface 46 of the coupling member 47 is preferably aligned with the bottom surface of connecting leg 44. The front bevel 49 and the bottom surface 46 of the coupling member 47 enclose an acute angle, which may be in the range between 10° and 60°, more preferably in the range between 15° and 45° and even more preferably in the range between 20° and 30°, as shown in FIG. 2b. Thus, the front end of the upper rail 1 may slide smoothly onto and over front bevel 49 of the coupling member 47 to finally cause a temporary positive fit coupling between the coupling member 47 and the upper rail, as outlined below in more detail.

The coupling member 47 further comprises a rear bevel 50, facing the front face 41 of the tab 4 and inclined under a relatively small acute angle of inclination relative to a line perpendicular to the bottom surface 46. Thus, the rear bevel 50 may be relatively steep. Anyway, the rear bevel ensures a swift displacement of the coupling member 47 relative to the tab 4 and movable support member, when the front end of the upper rail gets in contact with this rear bevel 50 and finally slides along rear bevel 50, as outlined below in more detail. In the embodiment of FIG. 2b, this displacement or movement of the coupling member 47 relative to the tab 4 and relative to the movable support member is implemented by a resilient bending of the connecting leg 44 relative to the main body 40 of tab 4. In other embodiments, this displacement may be implemented by pivoting the connecting leg 44 relative to the main body 40, as described below in more detail with reference to FIGS. 4a and 4b.

As shown in FIG. 2b, a U-shaped gap is formed between the front face 41 and the rear bevel 50, which basically corresponds to the length of the tab in axial direction of the rail assembly, which is provided at the front or rear end of the upper rail. More specifically, the width of this gap between the front face 41 and the rear bevel 50 may exactly correspond to the length of the tab in axial direction of the rail assembly, or may be a little wider for compensating clearance and tolerances. E.g. this gap may be by 10% to 25% wider than the length of tab in axial direction of the rail assembly.

The operating mode of a movable support member according to the present invention will now be described with reference to FIGS. 3a to 3e, which show the rail assembly according to the present invention in different positions of the upper rail relative to the lower rail in a partial cross-sectional view taken from an outer side of the rail assembly. These drawings show the rail assembly near the front end of the lower rail 2, where a retention tab 210 or a stopper projects into the inner volume of the rail assembly at a predetermined position near the front end of lower rail 2. As can be seen in FIGS. 3a-3e. the upper surface 405 of the base 401 of the movable support member 400 (see FIG. 2a) will serve as a supporting surface for additionally supporting the upper rail 1 on the lower rail 2 regardless of the longitudinal position of the upper rail 1 and in particular also in a position, when the upper rail 1 has reached its foremost position.

Figure 3A:
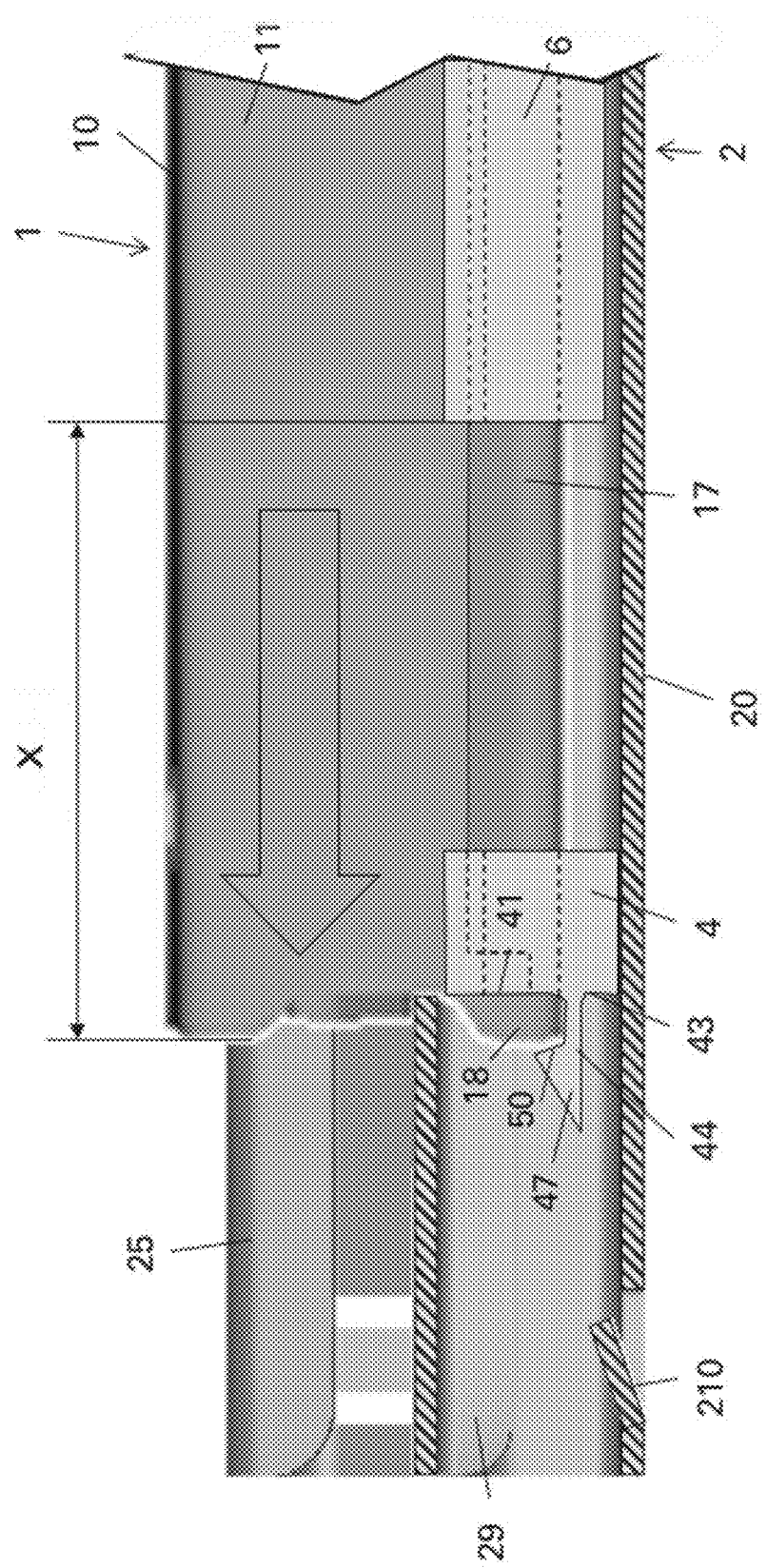
Figure 3B:
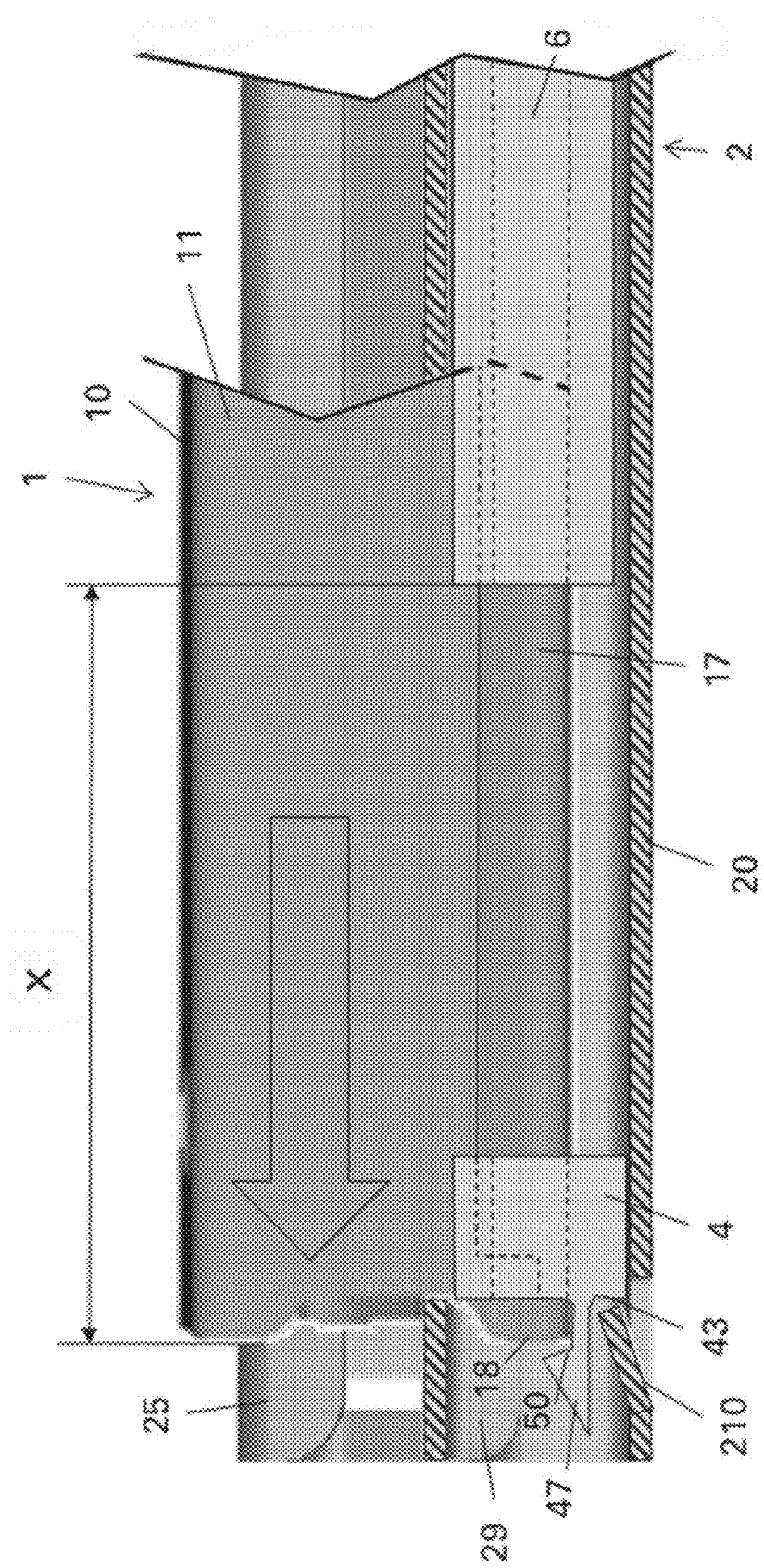
Figure 3C:
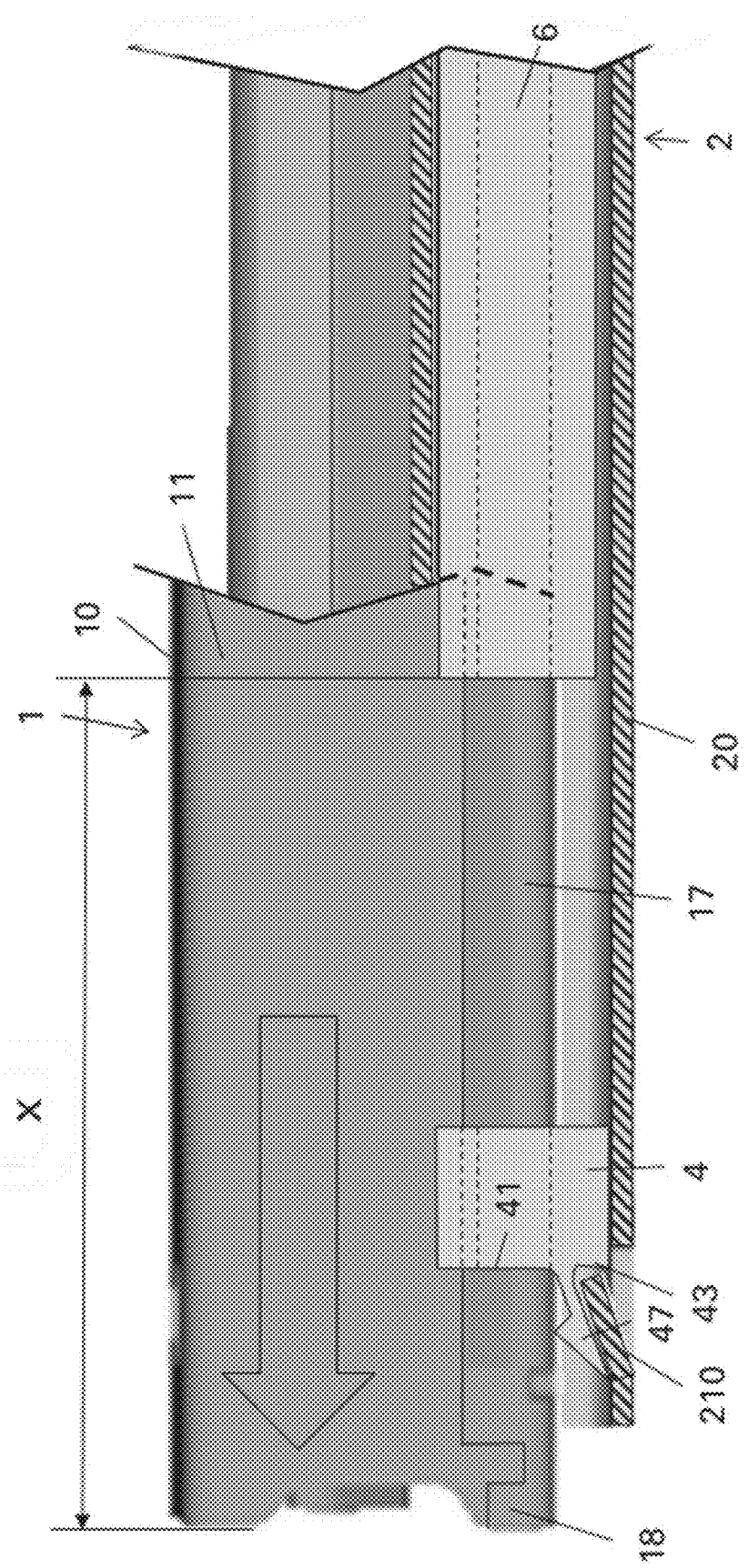

First, it is assumed that the upper rail 1 travels relative to the fixed (stationary) lower rail 2 in the forward direction (first direction), as indicated by the arrow directed toward the left-hand side of the drawings in FIGS. 3a-3c. In this condition, the rear face of tab 18 of upper rail 1 abuts against the front face 41 of the main body of tab 4, so that the movable support member including the tab 4 will be carried along automatically by the tab 18 of the upper rail 1. When the upper rail 1 is moved relative to the lower rail 2 in axial direction, the retainer 6 will travel basically at a ratio of 1:2 with the upper rail. Hence, if the upper rail 1 is moved toward the foremost position of its travel range, the retainer 6 will not have moved up to the front end of lower rail. Thus, in a conventional rail assembly the upper rail 1 is likely not to be sufficiently supported on the lower rail 2 in the region of the front end of lower rail 2.

In the condition shown in FIG. 3a, the coupling member 47 positively engages with the upper rail 1, because the tab 18 at the front end of the upper rail 1 is accommodated in the U-shaped gap formed between the front face 41 of tab 4 and the rear bevel 50 of the coupling member 47. As the coupling member 47 is connected with the main body of tab 4 via a flexible connecting leg that can be flexed toward the base leg 20 of the lower rail 2, this positive-fit coupling between the tab 4 and the upper rail 1 is temporary only, and can be released by flexing or pivoting down the connecting leg of coupling member 47.

Because according to the present invention the coupling member 47 can be temporarily coupled or linked with the upper rail 1 especially, when the upper rail 1 has travelled beyond the front end of the lower rail 2, the movable support member 400 can be displaced to the front end of the lower rail 2 to enable an additional support of the upper rail 1 on the lower rail 2 in the region of the front end of the lower rail 2.

As shown in FIG. 3a, the tab 4 is positively locked to the tab 18 of the upper rail 1. In this condition the tab 18 is received in the gap provided between the rear bevel 50 of the coupling member 47 and the front face 41 of the main body of tab 4. In other words, the coupling member 47 is hooked into the tab 18 at the front end of the upper rail 1. In this condition, the coupling member 47 is always disposed in front of the front end of the upper rail 1 and is carried along by the upper rail 1.

When the upper rail 1 is moved further toward the front end of the lower rail 2, as indicated by the arrow in FIG. 3a, the tab 4 is carried along by the tab 18 and is thus moved toward the retention tab 210, as shown in FIG. 3b. Finally, the bottom front face 43 of the main body of tab 4 comes in contact with the retention tab 210, which will stop the further movement of the movable support member towards the front end of the lower rail (first direction). For enhancing the positive fit between the tab 4 and the retention tab 210, the bottom front face 43 of the tab 4 may be a little slanted, as shown in FIG. 3b, which will dampen the sudden contact between the tab 4 and the retention tab 210.

When the upper rail 1 is moved further in this first direction, finally, the front end of tab 18 will contact the rear bevel 50 of the coupling member 47, which will then cause the front end of tab 18 to slide along the rear bevel 50, to thereby push down the coupling member 47 toward the base leg 20 of the lower rail 2. For the first embodiment of the movable coupling member 47 shown in FIGS. 3a-3e this will result in a resilient downward bending of the connecting leg 44 of the tab (see FIG. 2b), until finally the bottom surface of the coupling member 47 is bent fully downward to rest on the slanted upper surface of the retention tab 210, as shown in FIG. 3c.

In this position, the coupling between the coupling member 47 and the upper rail 1 is released. In other words, the coupling member 47 and the upper rail 1 are decoupled, so that the upper rail 1 is free to move further forward in the first direction, as indicated by the arrow in FIG. 3c. In this release position the upper end of coupling member 47 is vertically below the bottommost portion of the upper rail 1 in the linear guide 5b (see FIG. 1a) of the rail assembly, i.e. below the third connecting leg 16, and does not impede the further travel of the upper rail 1 in the first direction. Thus, in this release position the movable support member is locked to the lower rail 2 (at least as long as the upper rail 1 continues travelling into the first direction) and will remain stationary at the predetermined position defined by the position of the retention tab 210 at the lower rail 2.

Finally, the foremost position of the upper rail 1 will be reached, which will be limited by end tabs of the rails or the like in the conventional manner. The movable support member will be kept stationary from the position shown in FIG. 3c up to the foremost position of the upper rail 1. Over this entire travel range, the movable support member will serve as an additional support for additionally supporting the upper rail 1 on the lower rail 2, thus enabling an improved stability of the rail assembly.

When the upper rail 1 travels relative to the lower rail 2 in a second direction opposite to the afore-mentioned first direction, as shown in FIG. 3d and indicated by the arrow pointing toward the right-hand side of the drawing, the wedge-shaped coupling member 47 will remain trapped in the space between the base leg 20 and the underside of the third connecting leg 16 (see FIG. 1a). More specifically, the narrow gap between the upper end of retention tab 210 and the underside of the third connecting leg 16 of the upper rail 1 serves as a bottleneck and ensures that the uppermost end of the coupling member 47 remains in abutment with the underside of the third connecting leg 16, thus preventing the escape of the coupling member from this gap. Thus, the coupling member 47 will remain in the release position. In the release position, if the upper rail 1 travels in the second direction toward the rear end of the rail assembly, the cooperation of the wedge-shaped coupling member 47 with the retention tab 210 and the underside of the third connecting leg 16 will lock the movable support member to the lower rail 2 and keep it stationary relative to the lower rail 2.

Finally, the front end of the upper rail 1 and of the tab 18 will slide beyond the upper end of the wedge-shaped coupling member, which will cause the coupling member 47 return to its home position due to the resilient biasing of the coupling member 47 into this home position, as a result of the resiliency of the connecting leg 44 (see FIG. 2b) or of the force exerted by an additional biasing member, such as a spring, as will be outlined below in more detail for the second embodiment with reference to FIGS. 4a and 4b.

In the relaxed home position of the movable support member, shown in FIG. 3e, the coupling member 47 no longer couples the movable support member with the lower rail 2. Rather, the coupling member 47 will again positively lock the movable support member to the tab 18 and the upper rail 1. As shown in FIG. 3e, when the upper rail 1 is further moved in the second direction, the rear end of tab 18 of the upper rail 1 will abut against the front face 41 of the tab 4 of the movable support member so that the movable support member will be carried along by the tab 18 toward the rear end of the rail assembly.

While it has been described above that the retention tab is provided near a front end of the lower rail, it will become apparent to the skilled person that such a retention tab may also be provided near the rear end of the lower rail or near both the front and rear end of the lower rail. While it has been described that the retention tab is provided as a lug bent from the base leg of the lower rail upward toward the inner volume of the rail assembly, it will be apparent to the skilled person that similar stoppers or stopping members may be fixed to the base leg of the lower rail, e.g. by screwing or riveting, or may be formed in different manners from the material of the lower rail, also from other portions of the lower rail different to the base leg of the lower rail.

Thus, according to the present invention the displacement or position of the coupling member 47 relative to the main body of the movable support member is controlled by the position of the upper rail 1. In this way the coupling and decoupling of the movable support member to the lower rail is controlled. According to the invention, this control is such that an additional support of the upper rail on the lower rail is ensured near a front and/or rear end of the lower rail and in a foremost and/or rearmost position of the upper rail relative to the lower rail.

Figure 4B:
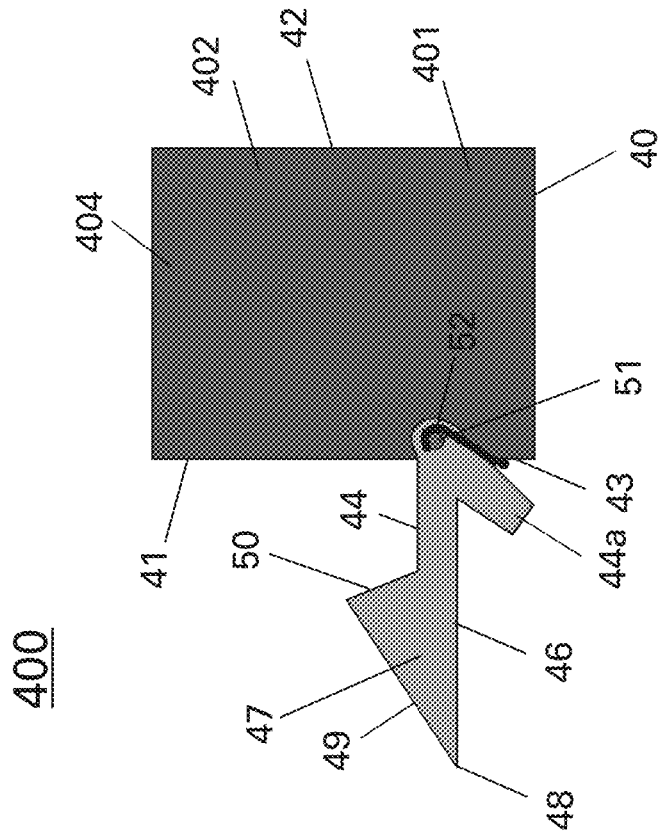
FIG. 4b is a side view of a movable support member according to the second embodiment of the present invention, for use in the rail assembly of FIG. 1a Throughout the drawings, like reference numerals designate identical or technically equivalent elements or groups of elements.
Figure 4A:
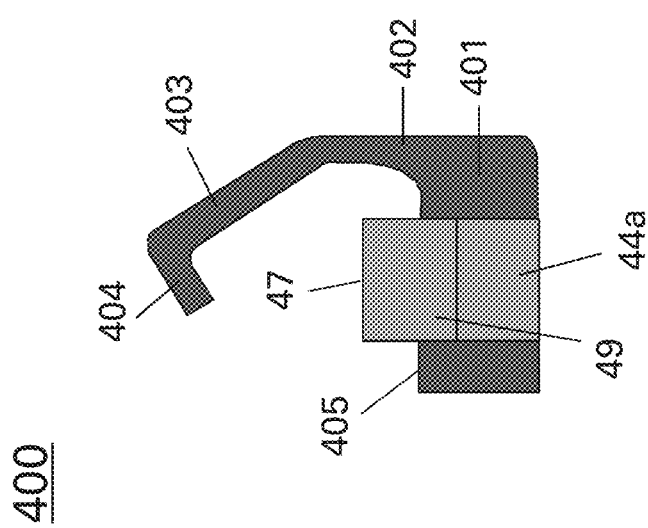

With reference to FIGS. 4a and 4b, a second embodiment of the movable coupling member according to the present invention will be described. The overall shape and configuration of this movable coupling member 400 is identical with the shape and configuration described with reference to FIGS. 2a and 2b above. However, in the second embodiment the coupling member 47 is not formed integrally with the main body 40 or base 401 of the moveable support member 400. Rather, the coupling member 47 is a separate element that is coupled with the base 401 of the movable coupling member 400 so that it can be displaced in the manner outlined above with reference to FIGS. 3a-3e. As shown in FIGS. 4a and 4b, the connecting leg 44 is pivotably supported at the base 401 so that it can be pivoted about a pivot point 51 disposed near the front face 41 of the base 401. For resiliently biasing the connecting leg 44 into the home position (coupled position) shown in FIG. 4b, a biasing spring 52 engages with the upper surface of connecting leg 44 and the bottom end 43 of front face 41. This biasing can also be implemented by other means, e.g. a spiral spring.

As shown in FIG. 4b, in the home position, when the movable support member 400 is positively locked to the tab of the upper rail (similar to the condition shown in FIG. 3a), the angled hook-shaped protrusion 44a of the connecting leg 44 protrudes from the bottom end 43 of front face 41. The angle of the hook-shaped protrusion 44a relative to front face 41 is similar as the angle of inclination of the retention tab 210 relative to the base leg 20 of the lower rail 2 (see FIG. 3a). Thus, when the tab of the movable support member is moved toward the retention tab, finally the hook-shaped protrusion 44a abuts against the rear side of retention tab. Moving the upper rail further into the first direction will then cause the connecting leg 44 to pivot in counter-clockwise direction about the pivot point 51. This downward pivoting of the connecting leg 44 may be stopped by abutment of the hook-shaped protrusion 44a against the bottom end 43 of front face 41.

On the other hand, when the upper rail is moved into the second direction, opposite to the first direction, the biasing of the connecting leg 44 will cause the connecting leg 44 to pivot in clockwise direction about the pivot point 51 into the home position, which will finally result in the condition shown in FIG. 3e.

LIST OF REFERENCE NUMERALS 1 upper rail
2 lower rail
3 rail assembly
4 tab of movable support member 400
5a linear guide
5b linear guide
6 retainer
10 base leg
11 L-leg
12 first connecting leg
13 second (slanted) connecting leg
14 bending portion
15 first end portion
16 third connecting leg
17 second end portion
18 stopper of upper rail 1
18a front stopper of upper rail 1
18b rear stopper of upper rail 1
19 stopper of upper rail 1
20 base leg
21 L-leg
22 first (slanted) connecting leg
23 second (slanted) connecting leg
24 third connecting leg
25 first end portion
26 fourth connecting leg
27 fifth connecting leg
28 sixth connecting leg
29 second end portion
210 tab of lower rail 2
40 main body
41 front face
42 rear face
43 slanted bottom front face
44 connecting leg
44a hook-shaped protrusion of connecting leg 44
45 base of connecting leg 44
46 bottom surface
47 coupling member
48 front tip
49 front bevel
50 rear bevel
400 movable support member
401 base
402 upright side-wall
403 slanted side-wall
404 front end of slanted side-wall
405 upper supporting surface
51 pivot point
52 biasing spring
60 base of retainer 6
610 front side-wall of retainer 6
620 rear side-wall of retainer 6
630 recess
640 recess
650 window

What is claimed is:

1. A rail assembly for longitudinal adjustment of a vehicle seat, comprising:
a lower rail and an upper rail, which is movably guided in a longitudinal direction relative to the lower rail, and
a movable support member disposed between the lower rail and the upper rail, wherein
the lower rail comprises a stopper disposed at a predetermined position of the lower rail, and
the movable support member comprises a base for supporting the upper rail on the lower rail and a coupling member for releasably coupling the movable support member with the upper rail, wherein
the coupling member is displaceable relative to the base,
movement of the movable support member relative to the lower rail in the longitudinal direction is stopped by the stopper at the predetermined position, and
displacement of the coupling member relative to the base is controlled by the position of the upper rail, for controlling a coupling and decoupling of the movable support member to the upper rail, wherein,
when the upper rail is moved relative to the lower rail in a first direction beyond the predetermined position, the movable support member is retained by the stopper and the coupling member is displaced to a release position releasing a coupling of the movable support member to the upper rail, so as to enable a further movement of the upper rail in the first direction, and when the upper rail is moved relative to the lower rail in a second direction opposite to the first direction beyond the predetermined position, the coupling member returns to a coupling position coupling the movable support member to the upper rail so that the movable support member is carried by the upper rail upon further movement of the upper rail in the second direction.

2. The rail assembly for longitudinal adjustment of a vehicle seat as claimed in claim 1, wherein the coupling member is resiliently biased against the base into the coupling position.

3. The rail assembly for longitudinal adjustment of a vehicle seat as claimed in claim 2, wherein the coupling member is connected with the base via a flexible leg.

4. The rail assembly for longitudinal adjustment of a vehicle seat as claimed in claim 3, wherein the coupling member is integrally formed with the base.

5. The rail assembly for longitudinal adjustment of a vehicle seat as claimed in claim 2, wherein the coupling member is pivotable about a pivot point of the base.

6. The rail assembly for longitudinal adjustment of a vehicle seat as claimed in claim 1, wherein the coupling member returns to the coupling position when the upper rail is moved relative to the lower rail in the second direction toward the predetermined position.

7. The rail assembly for longitudinal adjustment of a vehicle seat as claimed in claim 6, wherein the coupling member positively engages with a front end or rear end of the upper rail in the coupling position, for coupling the coupling member with the upper rail.

8. The rail assembly for longitudinal adjustment of a vehicle seat as claimed in claim 7, wherein a tab is provided at a front end or rear end of the upper rail configured to positively engage with the coupling member, for releasably coupling the movable support member with the lower rail.

9. The rail assembly for longitudinal adjustment of a vehicle seat as claimed in claim 8, wherein the tab protrudes from a lateral leg of the upper rail toward an interior of the rail assembly.

10. The rail assembly for longitudinal adjustment of a vehicle seat as claimed in claim 9, wherein in the coupling position the tab further abuts against an end face of the movable support member.

11. The rail assembly for longitudinal adjustment of a vehicle seat as claimed in claim 1, wherein the coupling member is configured to be pushed by the upper rail toward the lower rail when positioned at the predetermined position, so as to release coupling of the movable support member to the upper rail and to enable a further movement of the upper rail in the first direction.

12. The rail assembly for longitudinal adjustment of a vehicle seat as claimed in claim 11, wherein
the coupling member is connected with the base via a connecting leg and is wedge-shaped, and wherein
the coupling member comprises a slanted front bevel facing toward a first end of the coupling member and a slanted rear bevel facing toward the base of the movable support member.

13. The rail assembly for longitudinal adjustment of a vehicle seat as claimed in claim 12, wherein an angle of inclination of the front bevel relative to a bottom surface of the connecting leg is smaller than an angle of inclination of the rear bevel relative to the bottom surface of the connecting leg.

14. The rail assembly for longitudinal adjustment of a vehicle seat as claimed in claim 12, wherein a length of the connecting leg in the longitudinal direction corresponds to a length of the tab of the upper rail in the longitudinal direction.

15. The rail assembly for longitudinal adjustment of a vehicle seat as claimed in claim 1, wherein the stopper is formed at a bottom of the lower rail and protrudes into an inner volume of the rail assembly, for narrowing a gap between the upper rail and the lower rail.

16. The rail assembly for longitudinal adjustment of a vehicle seat as claimed in claim 15, wherein the stopper is formed as a planar retention tab protruding under an acute angle relative to the bottom of the lower rail into the inner volume of the rail assembly.

17. The rail assembly for longitudinal adjustment of a vehicle seat as claimed in claim 16, wherein the coupling member is connected with the base via a connecting leg, wherein in the released position the connecting leg is displaced relative to the base so as to abut against the retention tab.

18. The rail assembly for longitudinal adjustment of a vehicle seat as claimed in claim 1, further comprising an oblong retainer for accommodating bearing members disposed between the lower rail and the upper rail, wherein the oblong retainer is supported so as to be displaceable in the longitudinal direction.

19. The rail assembly for longitudinal adjustment of a vehicle seat as claimed in claim 17, wherein the oblong retainer does not extend beyond a front edge or rear edge of the upper rail or lower rail in any of the end positions of the upper rail.

20. A rail assembly for longitudinal adjustment of a vehicle seat, comprising:
a lower rail and an upper rail, which is movably guided in a longitudinal direction relative to the lower rail, and
a movable support member received in a gap between the lower rail and the upper rail and slidable in the gap in the longitudinal direction, wherein
the lower rail comprises a protrusion disposed at a predetermined position of the lower rail, which narrows the gap between the lower rail and the upper rail at the predetermined position, for limiting a travel range of the movable support member in the longitudinal direction, wherein
the movable support member comprises:
a supporting surface for additionally supporting the upper rail on the lower rail,
a stopping surface for delimiting a travel range of the movable support member in the longitudinal direction by abutment against the protrusion at the predetermined position, and
a coupling member for releasably coupling the movable support member with the upper rail, wherein
the coupling member protrudes from the stopping surface so as to extend beyond the protrusion when the supporting surface abuts against the protrusion,
the coupling member further comprises a locking member for positively locking the coupling member with the upper rail, and
the coupling member can be elastically deformed or flexed toward the protrusion for releasing a positive locking between the coupling member and the upper rail when the supporting surface abuts against the protrusion.

21. A rail assembly for longitudinal adjustment of a vehicle seat, comprising:
a lower rail and an upper rail, which is movably guided in a longitudinal direction relative to the lower rail, and a movable support member disposed between the lower rail and the upper rail, wherein the lower rail comprises a stopper disposed at a predetermined position of the lower rail, and the movable support member comprises a base for supporting the upper rail on the lower rail and a coupling member for releasably coupling the movable support member with the upper rail, wherein the coupling member is displaceable relative to the base, movement of the movable support member relative to the lower rail in the longitudinal direction is stopped by the stopper at the predetermined position, and displacement of the coupling member relative to the base is controlled by the position of the upper rail, for controlling a coupling and releasing a coupling of the movable support member to the upper rail, wherein the coupling member is configured to be pushed by the upper rail toward the lower rail when positioned at the predetermined position, so as to release a coupling of the movable support member to the upper rail and to enable a further movement of the upper rail in the first direction.

* * * * *